US005615893A

United States Patent [19]
Reagan

[11] Patent Number: 5,615,893
[45] Date of Patent: Apr. 1, 1997

[54] SPLIT FACE MECHANICAL SEALING RINGS AND THEIR USE

[75] Inventor: Michael P. Reagan, Greenwell Springs, La.

[73] Assignee: Power Packing Company, Inc., Baton Rouge, La.

[21] Appl. No.: 585,925

[22] Filed: Jan. 16, 1996

[51] Int. Cl.$^6$ .................................................. F16J 15/34
[52] U.S. Cl. .......................... 277/81 S; 277/9.5; 277/223
[58] Field of Search ........................ 277/9.5, 11, 81 S, 277/205, 218, 223, 192, 197

[56] References Cited

U.S. PATENT DOCUMENTS

| | | | |
|---|---|---|---|
| 1,198,457 | 9/1916 | Knodle . | |
| 1,361,672 | 12/1920 | Blair | 277/218 |
| 1,467,256 | 9/1923 | Thompson . | |
| 1,889,828 | 12/1932 | Gehrman . | |
| 2,486,928 | 11/1949 | Cole | 288/3 |
| 2,688,522 | 9/1954 | Hoyt et al. | 369/46 |
| 2,738,243 | 3/1956 | Sawyer | 309/46 |
| 2,996,319 | 8/1961 | Copes | 286/11.15 |
| 3,006,667 | 10/1961 | Stephens | 286/11.15 |
| 3,101,200 | 8/1963 | Tracy | 277/93 |
| 3,180,650 | 4/1965 | Liebig | 277/206 |
| 3,245,693 | 4/1966 | Way | 277/222 |
| 3,728,041 | 4/1973 | Bertelson | 277/199 |
| 3,941,394 | 3/1976 | Lukes | 277/40 |
| 4,410,188 | 10/1983 | Copes | 277/815 |
| 4,477,086 | 10/1984 | Feder et al. | 277/205 |
| 4,576,384 | 3/1986 | Azibert | 277/81 S |
| 4,589,666 | 5/1986 | Halling | 277/200 |
| 4,759,555 | 7/1988 | Halling | 277/200 |
| 4,986,168 | 1/1991 | Geffroy et al. | 92/194 |
| 5,163,692 | 11/1992 | Schofield et al. | 277/205 |
| 5,203,576 | 4/1993 | Miyaoh et al. | 277/9.5 |
| 5,280,927 | 1/1994 | Greisinger | 277/216 |
| 5,403,020 | 4/1995 | McOnie | 277/815 |

*Primary Examiner*—Daniel G. DePumpo
*Attorney, Agent, or Firm*—John F. Sieberth

[57] ABSTRACT

Sectioned mechanical sealing rings divided into at least two sealing ring segments aligned by special aligning clips are described. Each ring segment has an arcuate inner wall portion having an arcuate recess therein traversing and extending laterally on both sides of the interface between adjacent segments. An aligning clip is positioned in the recess of one segment adjacent the interface and fastened so that it projects into the recess on the other side of the interface. The clips are U-shaped and the projecting U-shaped portions have essentially the same outer width as the width of the recess. When not inserted into the recess the legs of the clips diverge so that when installed in the recess, the legs lie flat and are tensioned against the walls defining the recess. By ensuring proper alignment of the segments, the clips minimize the possibility of damage to the sealing ring during installation, facilitate the overall assembly operation, and reduce the possibility of fluid leakage through the mechanical seal due to improper alignment. Moreover, the clips avoid the need for altering one or more of the co-engaging interfacial surfaces of the ring segments such as by boring, machining or otherwise creating holes or complex interlocking configurations in such surfaces.

20 Claims, 8 Drawing Sheets

SPLIT FACE MECHANICAL SEALING RINGS AND THEIR USE

TECHNICAL FIELD

This invention relates to improved sectioned mechanical sealing rings for use in mechanical seals.

BACKGROUND

Mechanical seals are designed for use on a wide variety of machines having rotating shafts that pass through housings, such as pumps, agitators, blenders, separators, refiners, dryers and mixers. The function of the mechanical seal is to prevent leakage of pressurized fluids. In the mechanical seals to which this invention relates—sometimes referred to as a rotary face seal—sealing is achieved by arranging at least two durable sealing rings having extremely flat radially extending sealing faces axially adjacent to each other and concentrically disposed about the shaft so that the faces are in sealing contact. One ring is held stationary in the seal housing or gland while the other rotates with the shaft as part of a unit sometimes termed a rotary.

Repair or replacement of parts of such seals is difficult whenever inaccessibility of the outboard end of the shaft or the location of the machine make it impossible to slip the seal off the end of the shaft. In such situations, the machines themselves must be disassembled. To facilitate such repair or replacement of parts, use has been made of radially split sealing rings and other seal parts so that each ring may be removed from, and new rings reassembled within, the seal and about the shaft.

Typically, split rings are manufactured by cutting a whole ring into two segments. With cut rings, the cut faces of one ring segment thereby created are precisely lapped while discarding the other ring segment and mating the one segment with a segment from another whole ring of the same dimensions as a whole ring. Broken rings are also known and used. One type of broken ring, typically made of carbon, has irregular broken surfaces which permit self matching of the ring halves without lapping. On the other hand, broken rings formed by scoring and breaking rings made from silicon carbide or certain ceramic materials, tend to break quite cleanly and smoothly to provide substantially planar matching surfaces with only slight surface irregularities.

Mechanical seals of various designs utilizing split sealing rings are disclosed, for example, in U.S. Pat. Nos. 2,996,319; 3,101,200; 4,576,384; and G. B. 917,693. In addition, mechanical seals employing such split ring technology are available as articles of commerce from a number of manufacturers.

During installation of the split seal segments in the gland, precise alignment of the segments is essential. In the first place, proper alignment of the segments at the outset of installation minimizes the possibility of damage to the sealing ring through misalignment or incorrect contact between the co-engaging or abutting surfaces at the interfaces between the segments. This is especially important in the case of split sealing rings fabricated from carbon, silicon carbide or other similar ceramic or non-metallic materials, as segments made from such materials can become chipped or otherwise damaged if misaligned during assembly operations. Secondly, since the radially disposed sealing faces of the respective sealing rings must provide an extremely flat interface between these interacting faces, improper alignment, even if barely perceptible visually, can result in fluid leakage through the mechanical seal. This problem tends to be particularly troublesome in the case of silicon carbide or ceramic seals formed by scoring and breaking the ring to form substantially planar matching faces on the ring segments. And, in addition, if the ring segments can be placed in precise alignment easily and quickly, the overall assembly operation is greatly facilitated. While various alignment means for split rings have been designed or proposed heretofore, these have often required altering one or more of the co-engaging surfaces such as by boring, machining or otherwise creating holes or complex interlocking configurations in the seals at the co-engaging surfaces.

SUMMARY OF THE INVENTION

This invention avoids the problems noted above by providing highly effective and economical ways of suitably aligning the segments of split sealing rings without use of holes or complex interlocking configurations in or at the co-engaging surfaces of the sealing ring segments.

In one of its embodiments this invention provides an improved sectioned mechanical sealing ring divided into at least two sealing ring segments. Each segment has (a) an arcuate outer wall portion; (b) a radially extended sealing face; (c) two sealing end surfaces, each sealing end surface being co-engageable with a sealing end surface of another such segment to form an interface between that pair of sealing end surfaces, and (d) an arcuate inner wall portion having an arcuate recess therein that extends laterally (and most preferably in a right angular direction away from) the interface so that when the segments are aligned with their sealing end surfaces in co-engagement, the arcuate recess traverses and extends laterally on both sides of each respective interface. The recess is defined in width by a pair of spaced-apart parallel radially extended interior wall faces of a pair of spaced-apart arcuate walls in each such segment. Rings of this configuration have been on sale and use in the United States for more than one year. However, the novel improvement in such sealing rings pursuant to this invention provides the solution to the above-noted problems. In accordance with this improvement, one of each pair of the co-engageable sealing end surfaces has projecting therefrom an aligning clip disposed between and engaging the interior wall faces of the recess on one side of the interface between the co-engageable sealing end surfaces of the sealing ring segments. Additionally, the clip is extendable into the recess on the other side of the interface to thereby maintain the sealing end surfaces in detachable co-engagement and alignment with each other. Thus when the sealing end surfaces are co-engaged and aligned with each other by means of the aligning clip, the sealing faces form a flat radially-disposed annular sealing end surface; the arcuate inner wall portions define an annular interior wall portion, and the arcuate outer wall portions define an annular exterior wall portion.

The clip is a U-shaped clip mounted in the recess such that the legs are tensioned against the interior wall faces defining the recess on one side of the interface, and with the U-shaped portion projecting beyond the proximate sealing end of the segment. The projecting U-shaped portion has essentially the same outer width as the width of the recess. When not inserted into the recess, the legs of the clips diverge. When installed in the recess, the legs lie flat and are tensioned against the walls defining the recess. Thus when an adjacent mating segment of the sealing ring is installed, the U-shaped portion of the clip fits into the recess of the adjacent segment and aligns both segments. The fit between the projecting U-shaped portion of the clip and the interior wall faces of the recess of the adjacent segment is a slidable fit with no perceptible clearance and no perceptible interference between the clip and wall faces of the recess or groove into which the U-shaped portion extends. When properly aligned, the clip thus provides axial and radial alignment of the sealing ring segments.

While the sealing ring can have more than two such segments, the preferred sealing rings of this invention are divided substantially diametrically into a pair of such sealing ring segments. Since one clip is employed at each interface between adjacent segments, two aligning clips are thus used with these preferred sealing rings composed of a pair a mating ring segments that define the complete ring.

In another embodiment, the pair of spaced-apart arcuate walls that define the recess and the recess itself extend around substantially the entire interior of the assembled sealing ring. Thus in this embodiment all or almost all of the inner circumference of the assembled and properly aligned sealing ring is recessed or grooved. Most preferably, the arcuate wall remote from the radially extended sealing face of each segment has at least two spaced-apart transverse notches leading substantially at right angles from the recess. Each notch is thus disposed to receive a retainer to secure said segment to the gland of a mechanical seal against the tension of tension means disposed between the gland and the segment and to secure the segment against rotation in the gland. Use pursuant to this invention of the alignment clip in a sealing ring of this configuration results in the recess serving several functions. Firstly, the recess and walls deeming the recess serve as the retainer for the aligning clip. Secondly, the recess and walls defining the recess work in conjunction with the aligning clip to properly align the segments of the sealing ring during installation of the mechanical seal. And thirdly, the notches in the wall remote from the radial sealing face retain their ability to cooperate with the recess to provide an efficient way of receiving a retainer such as a retainer pin to secure the segment to the gland of the mechanical seal against the tension of tension means, such as coiled springs, disposed between the gland and the segment, and to secure the segment against rotation in the gland.

In one embodiment, the aligning clip is adhesively bonded to the interior wall faces of the arcuate walls. In another form, the clip has a lateral extension that is shaped, sized and configured to fit over and onto one of the walls defining the recess with a portion of that extension bent so that it is tensioned against the outer face of that wall. Thus in this embodiment the clip need not be adhesively bonded onto the sealing ring segment.

These and other embodiments and features of the invention will become still further apparent from the ensuing description, accompanying drawings and appended claims.

BRIEF DESCRIPTION OF THE DRAWINGS

In the Figures, like numerals represent like parts among the different Figures. In some cases letters are associated with the same numeral to facilitate description by differentiating between more than one identical part.

In order to ensure compliance with the best mode requirement of the patent law of the United States as it may be interpreted from time to time by the courts, the drawings as submitted with this application as filed include dimensional information pertaining to the then present best modes contemplated. It is to be understood and appreciated, however, that this invention is not intended to be restricted or in any way limited to such dimensional information except as may otherwise be expressly set forth in the claims hereof.

FURTHER DETAILED DESCRIPTION

Figure 1:
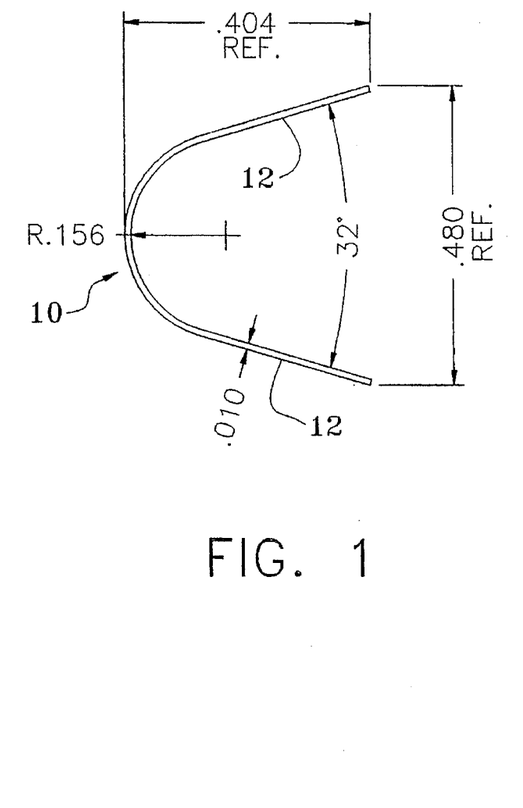
FIG. 1 is a top view of a preferred U-shaped aligning clip of this invention in its configuration prior to installation in a recess of a sealing ring segment.
Figure 2:
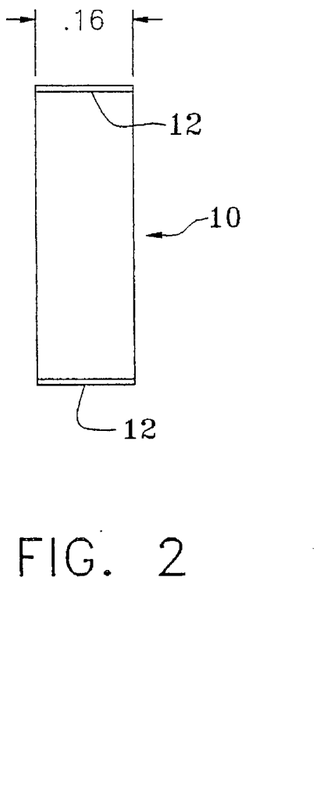
FIG. 2 is an end view of the clip of FIG. 1 in its configuration prior to installation, and as viewed from the open end of the clip.

In the form depicted in FIGS. 1 and 2 the aligning clip is a unitary body composed of U-shaped end 10 and a pair of spaced-apart leg portions 12,12, which are preferably of equal length. By virtue of the angular spread of the bend, the legs normally diverge from each other. However, as indicated for example in FIG. 11, when compressed and aligned in parallel by installation in a ring segment 14 between a pair of parallel wall faces 16,16 with end 10 projecting beyond sealing end face 18, the legs are tensioned against and lie flat against the adjacent wall faces 16,16. For best results leg portions 12,12 are secured in place against the walls by means of a suitable adhesive such as an acrylic adhesive. As seen from FIG. 13, the projecting U-shaped end 10 fits into the recess defined by spaced apart wall faces 16A,16A of the mating ring segment 14A. As depicted in FIGS. 10–13, the pair of alignment clips used with a ring split into two segments are typically installed in the two ends of the same ring segment 14, but if desired, one clip can be installed in ring segment 14 to project and fit into an unoccupied mating recess of ring segment 14A, and the other clip can be installed in the recess at the other end of segment 14A to project and fit into the unoccupied mating recess at the other end of segment 14. A feature of the clips of this invention is that it is not necessary to hold a critical tolerance along the wall faces as the legs 12,12 readily adapt to minor surface imperfections that may possibly exist. However, the recesses themselves should be in suitable precise alignment on opposite sides of the interface so that when the clips are in place in the assembled sealing ring, the resultant annular radial sealing face is smooth and flat.

Figure 3:
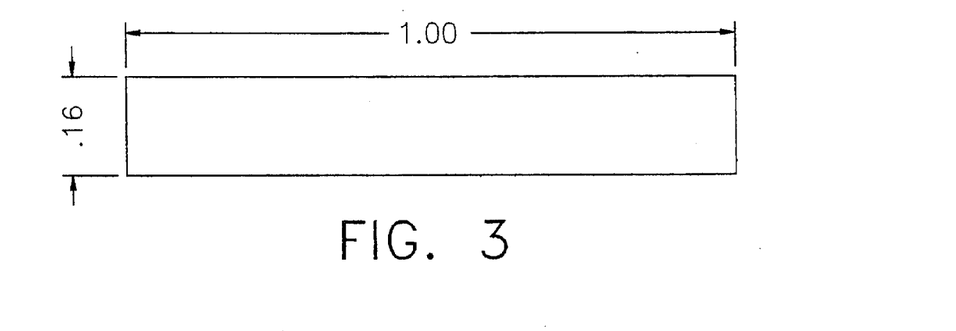
FIG. 3 is a plan view of a blank used in forming the clip of FIGS. 1 and 2.
Figure 4:
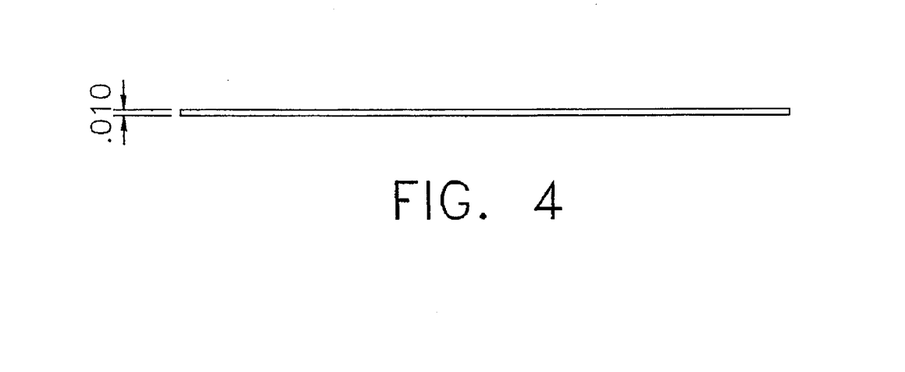
FIG. 4 is a side view of the blank of FIG. 3.
Figure 11:
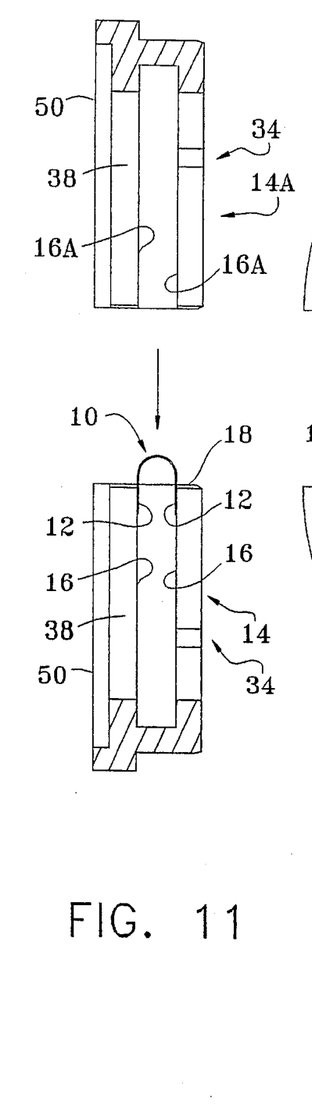
FIG. 11 is an exploded sectional view taken along line 11,11 of FIG. 10.
Figure 12:
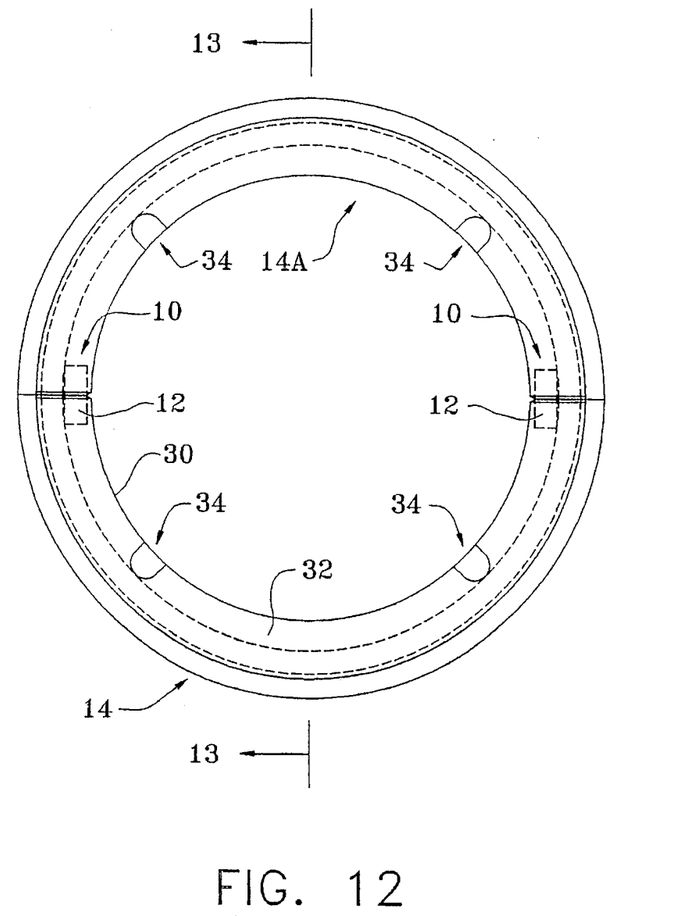
FIG. 12 is a rear plan view of the sealing ring of FIG. 10 when assembled in proper alignment.
Figure 13:
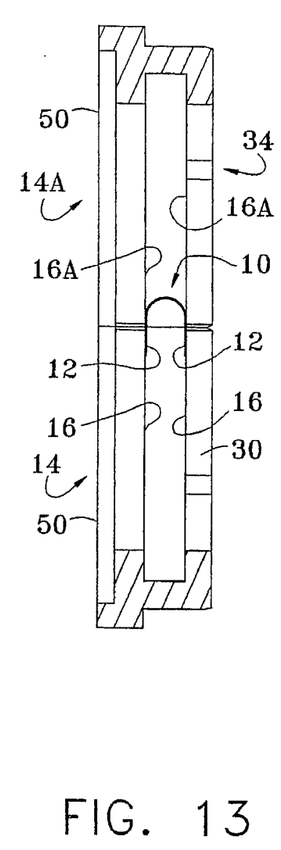
FIG. 13 is a sectional view taken along line 13,13 of FIG. 12.
Figure 14:
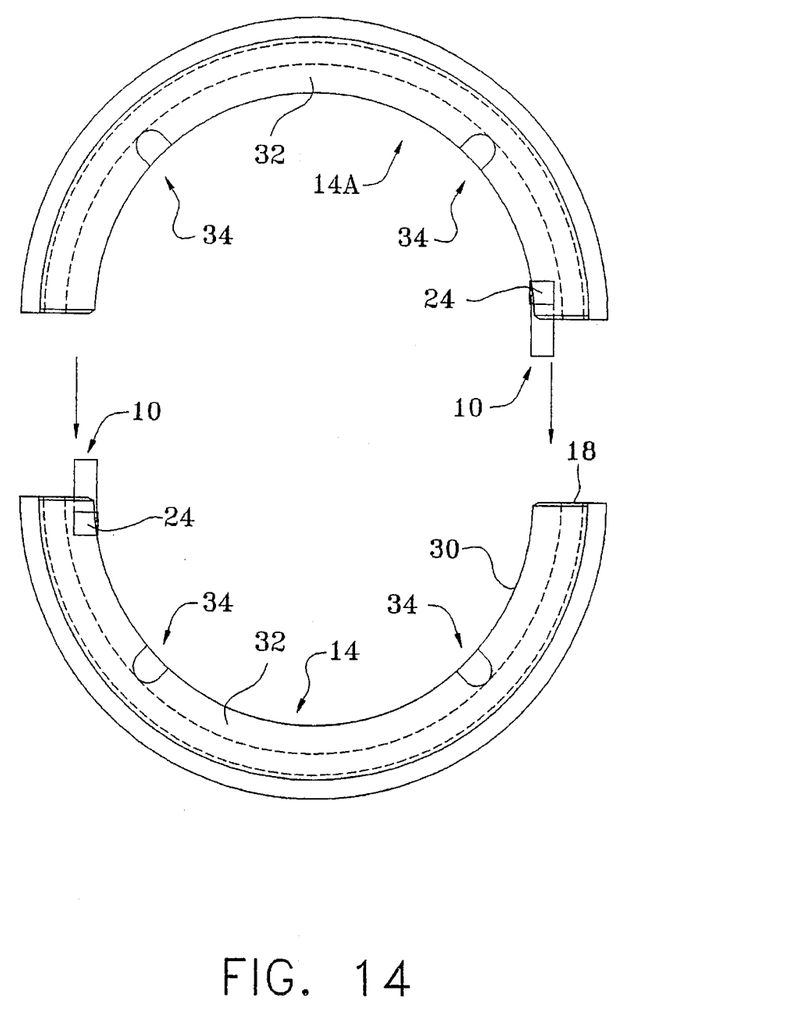
FIGS. 14–17 correspond, respectively, to FIGS. 10–13 except that the pair of aligning clips are of the type depicted in FIGS. 5, 6, and 7.
Figure 15:
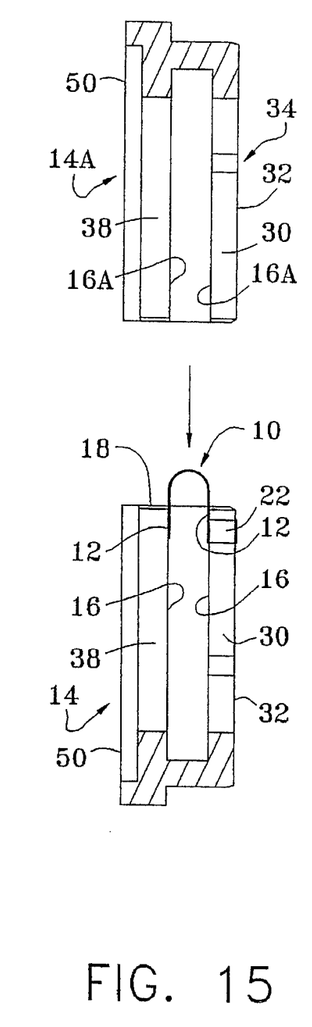
Figure 16:
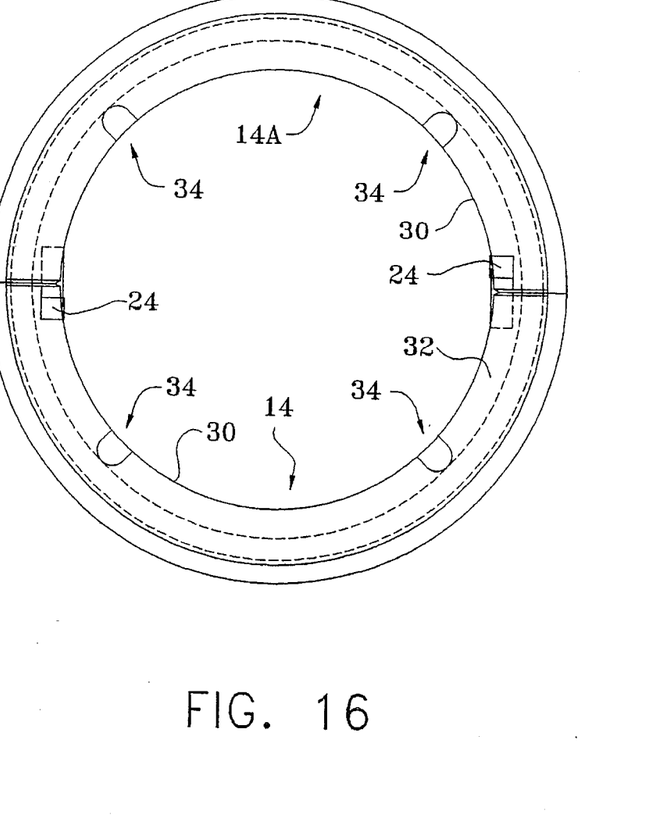
Figure 17:
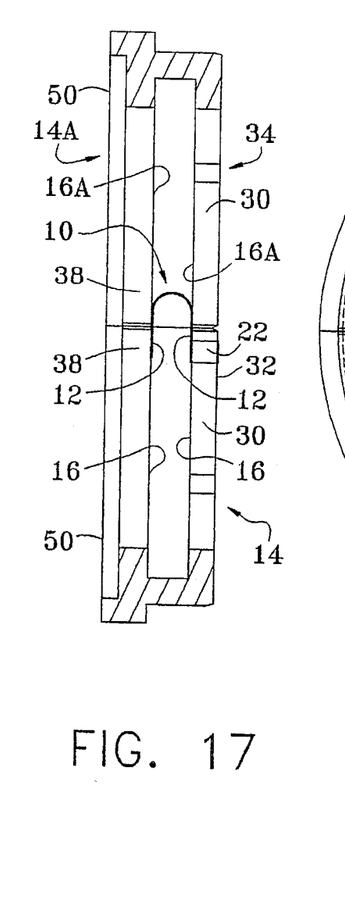

FIGS. 3 and 4 depict the blanks from which the clips of FIGS. 1 and 2 are formed. Preferably the blanks are composed of thin strips of 304 stainless steel, but can be formed from other suitable materials which provide appropriate spring tension when bent into a symmetrical U-shape as depicted in FIG. 1 and compressed as depicted in FIG. 11. Among other suitable materials are blue tempered steel, carbon-steel and various stainless steel alloys. While the size of the strips is dependent upon the size of the ring segments, strips having a thickness falling in the range of about 0.008 to about 0.02 inch, more preferably about 0.01 inch, are typically employed. It is also preferred to provide chamfered edges and beveled or rounded corners to avoid the presence of any sharp edges. The materials from which segments 14 and 14A are fabricated can likewise vary. Preferably they are composed of silicon carbide, but may be formed from carbon or suitable ceramic, intermetallic or composited materials.

Figures 5, 7:
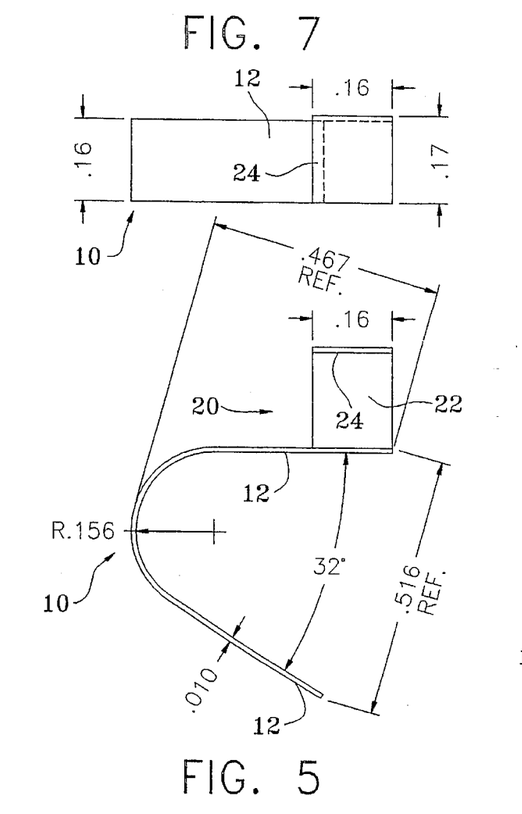
FIG. 5 is a bottom view of another preferred U-shaped aligning clip of this invention in its configuration prior to installation in a recess of a sealing ring segment.
FIG. 7 is a side view of the clip of FIGS. 5 and 6, and as viewed from the side toward which a lateral clip-on portion extends.
Figure 6:
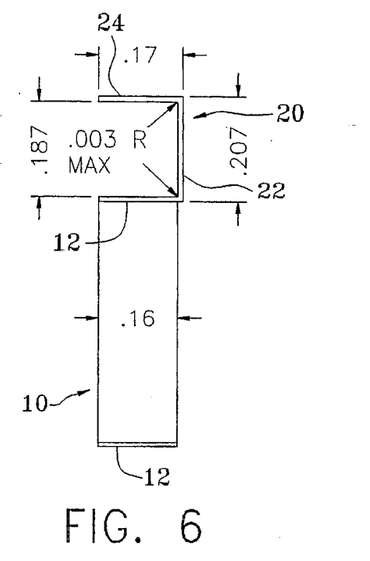
FIG. 6 is an end view of the clip of FIG. 5 in its configuration prior to installation, and as viewed from the open end of the U-shaped portion of the clip.
Figures 8, 9:
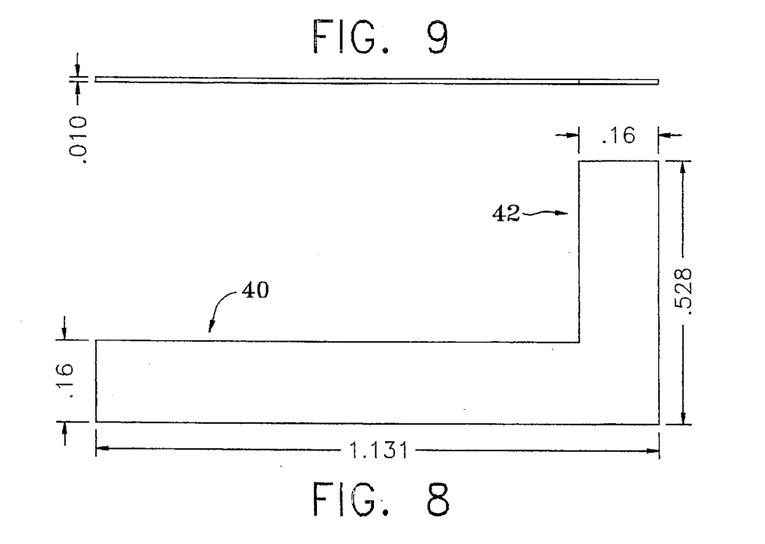
FIG. 8 is a plan view of a blank used in forming the clip of FIGS. 5, 6 and 7.
FIG. 9 is a side view of the blank of FIG. 8.
Figure 10:
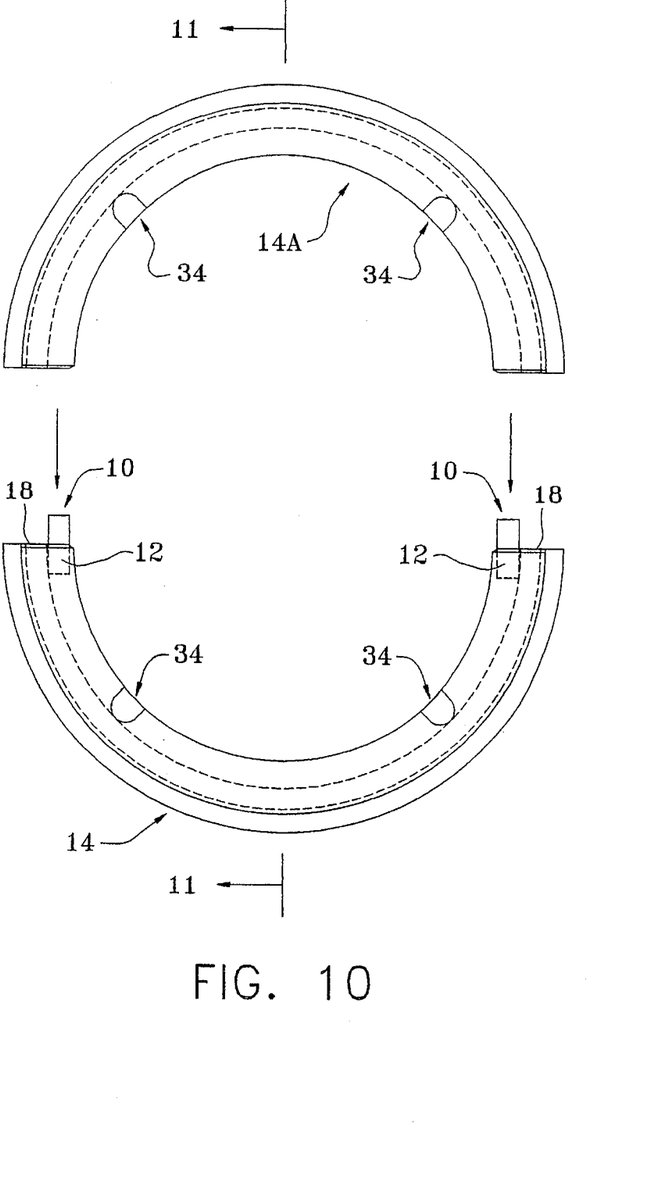
FIG. 10 is an exploded rear plan view of a preferred sealing ring of this invention divided substantially diametrically into a pair of sealing ring segments and having installed therein a pair of clips of the type depicted in FIGS. 1 and 2.

The aligning clip in the form depicted in FIGS. 5–7 is a unitary body which is also composed of U-shaped end 10 and a pair of spaced-apart leg portions 12,12, which are preferably of equal length and normally diverging from each other as depicted in FIG. 5. And as indicated for example in FIG. 15, when compressed and aligned in parallel by installation in a ring segment 14 between a pair of parallel wall faces 16,16 with end 10 projecting beyond sealing end face 18, the legs are tensioned against and lie flat against the adjacent wall faces 16,16. However, the aligning clip of FIGS. 5–7 is configured for installation on the ring segment without requiring use of any adhesive. This is accomplished by forming the clip from an L-shaped blank such as depicted in FIGS. 8 and 9 whereby portion 40 of the "L" of the blank is bent to form the U-shaped end portion 10 of the clip and creating a laterally extended clip on portion 20 which in the form depicted is shaped and sized to fit snugly onto rear wall 30 of segment 14. Thus in this case portion 42 of the "L" of the blank is bent at right angles at two places to form lateral segment 22 which fits on top of wall 30 and pendant segment 24 which fits snugly against rear face 32 of wall 30 to hold the clip in place. As seen from FIG. 17, the projecting U-shaped end 10 of this clip fits into the recess defined by spaced apart wall faces 16A,16A of the mating ring segment 14A. As depicted in FIGS. 14–17, one of the pair of these alignment clips is typically installed in one end of one ring segment 14 to project and fit into an unoccupied mating recess of ring segment 14A, and the other such clip is typically installed in the recess at the other end of segment 14A to project and fit into the unoccupied mating recess at the other end of segment 14. In this way both clips can have the same configuration—i.e., it is unnecessary to distinguish between a clip having a right-handed lateral extension and a clip having a left-handed lateral extension as would be required if the clips were configured for installation in the recess at both ends of only segment 14 or of only segment 14A for insertion into the unoccupied end portions of the other segment. However, the provision and use of sets of clips, one having a right-handed lateral extension and the other a lefthanded lateral extension is within the purview and scope of this invention.

The laterally extended clips of the clip-on configuration of FIGS. 5–7 have all of the advantages of the clips of FIGS. 1 and 2, and, as noted, do not require use of an adhesive to affix them on the rear wall of the seal segments. However, an adhesive can be used with the clip-on type clips if desired. It will be appreciated that the clip-on type of alignment clips are for attachment over and against the rear wall 30 of the sealing ring segments. The radial extended annular sealing face 50 of the sealing ring is to remain entirely flat and unencumbered by any extraneous object.

As noted above, and as depicted in FIGS. 10–17, it is preferred to provide transverse notches 34 in the rear wall 30, i.e., the wall remote from wall 38. Notches 34,34 are disposed to receive a retainer such as a pin to hold the aligned segments in place against a suitably disposed wall of gland 60 against the tension of tension means such as a plurality of radially disposed springs 62. In this way the segment, and thus the assembled sealing ring is secured against rotation in the gland.

Figure 18:
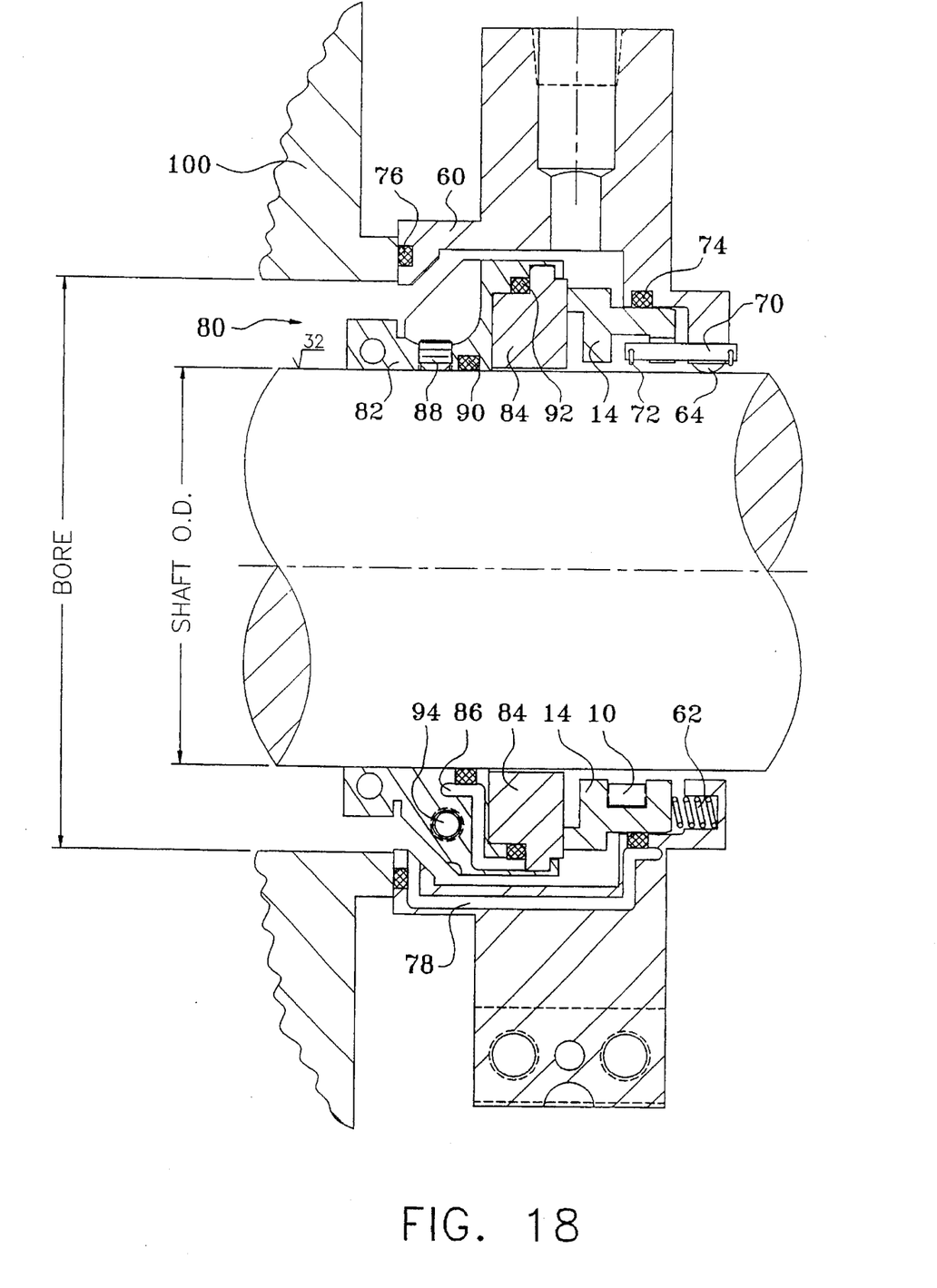
FIG. 18 depicts in section (except for the rotary shaft) a preferred mechanical seal assembly with improved sealing rings of this invention installed therein, in which the upper part is taken in one axial plane and the lower part in a different axial plane.

Another feature of the improved sealing rings of this invention is their adaptability for use with any of a wide variety of mechanical seal assemblies. Thus this invention further provides a mechanical seal assembly comprising (i) a stationary gland having secured therein a non-rotatable split mechanical seal having an axially disposed sealing face, (ii) a rotary affixed to a rotatable shaft and including a mechanical seal disposed to rotate with the shaft and having an axially disposed sealing face adapted to sealably and rotatably engage the sealing face of the split mechanical seal, and (iii) means for maintaining the sealing faces in sealable engagement with each other, in which the split mechanical seal is a sectioned mechanical sealing ring in accordance with this invention. FIG. 18 illustrates one such assembly in which the sealing rings of this invention are preferably employed.

Figure 19:
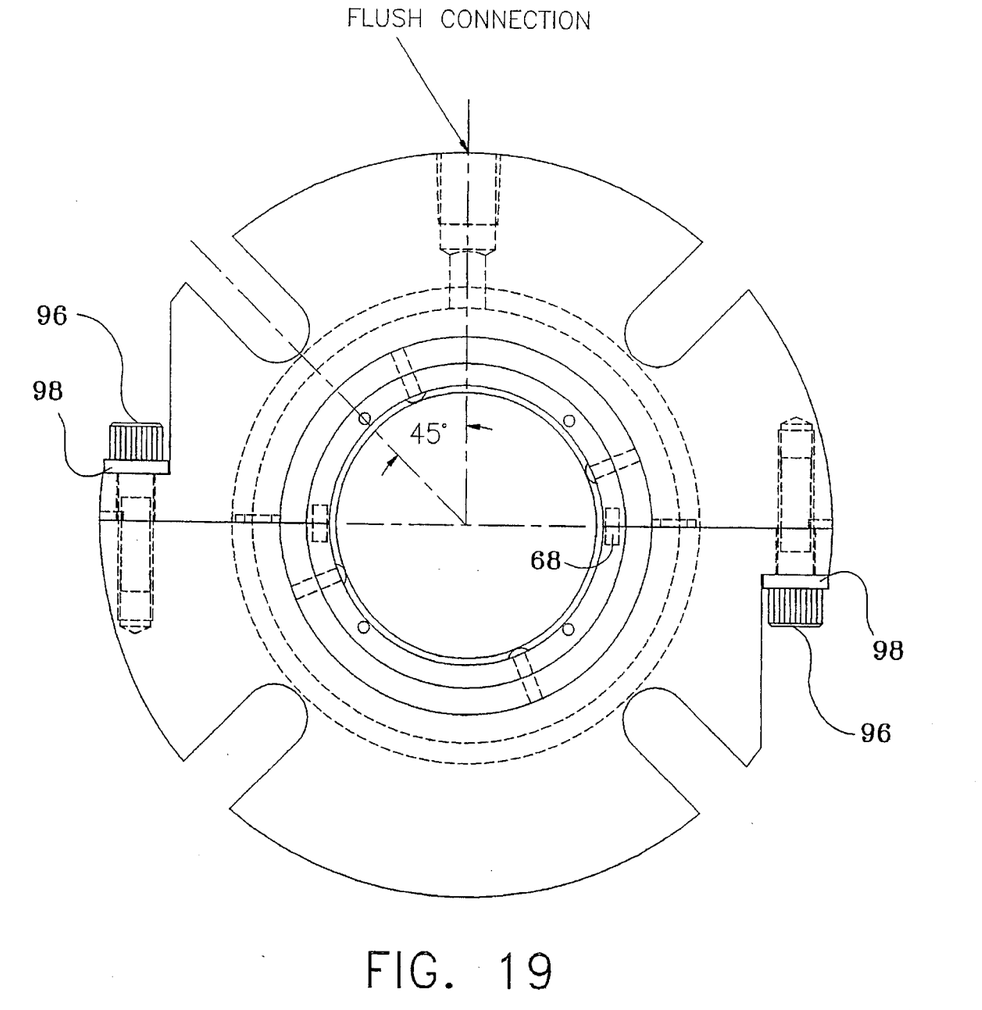
FIG. 19 is an end view of the assembly of FIG. 18.

Referring to FIG. 18 the assembly is a split mechanical seal composed in essence of gland 60 and its associated components, and rotary 80 and its associated components. The depicted components associated with gland 60 include one of the radially disposed springs 62, centering spacer 64, ring segment 14 of a sectioned stationary ring secured against rotation in gland 60 by one of the retainer pins 70 and its holding clip 72, U shaped end 10 of an aligning clip of this invention, O-ring 74, O-ring 76, and gland gasket 78. The depicted components associated with rotary 80 include collar 82, rotary seal 84, collar gasket 86, set screw 88, O-ring 90, O-ring 92, and one of two cap screws 94 which secure the two collar halves 82 together. As seen from FIG. 19, the two axially divided halves of the mechanical seal are secured together by means of cap screws 96 which are fitted with washers 98. As can be seen from FIG. 18, the space between housing 100 and the rotatable shaft of the apparatus with which the assembly is used is effectively sealed against pressurized fluid leakage from the interior of the housing.

Typical non-limiting examples of some alignment clips of this invention are set forth below.

EXAMPLE 1

An alignment clip of the type depicted in FIGS. 1 and 2 is formed on a mandrel from strips of 304 stainless steel, each strip being about 0.88 inch long, about 0.12 inch wide and about 0.01 inch thick. The clip has a U-shaped end with a radius of about 0.125 inch, and a pair of spaced-apart diverging linear leg portions of equal length which are about 0.42 inch apart at their free ends. These clips are especially adapted for use with a sectioned mechanical sealing ring in which the recess or channel is about 0.265 inch wide. Such seals are typically sized for use on rotatable shafts with diameters in the range of about 1.500 to about 2.625 inches.

EXAMPLE 2

An alignment clip of the type depicted in FIGS. 1 and 2 is formed on a mandrel from strips of 304 stainless steel, each strip being about 1.00 inch long, about 0.16 inch wide and about 0.01 inch thick. The radius of the U-shaped end is about 0.140 inch. The pair of spaced-apart diverging linear leg portions of equal length are about 0.48 inch apart at their free ends. These clips are especially adapted for use with a sectioned mechanical sealing ring in which the recess or channel is about 0.296 inch wide. Such seals are typically sized for use on rotatable shafts with diameters in the range of about 2.750 to about 4.875 inches.

EXAMPLE 3

An alignment clip of the type depicted in FIGS. 1 and 2 is formed on a mandrel from strips of 304 stainless steel, of the same dimensions as those of Example 2. The U-shaped end of the clip has a radius of about 0.156 inch. The pair of spaced-apart diverging linear leg portions of equal length are about 0.48 inch apart at their free ends. These clips are especially adapted for use with a sectioned mechanical sealing ring in which the recess or channel is about 0.312 inch wide. Such seals are typically sized for use on rotatable shafts with diameters in the range of about 5.000 to about 7.000 inches.

It will be noted that an aligning clip of the type described in the above examples comprises a generally rectangular strip of flexible metal bent at its median portion into a generally U-shaped member in which the legs diverge, the member consisting of a central rounded portion and two diverging linear leg portions of essentially equal length. Generally speaking, the radius of the central U-shaped portion is in the range of about 0.1 to about 0.2 inches and the angle of divergence between the leg portions is in the range of about 30° to about 40°.

The entire disclosure of each and every U.S. patent and of each and other publication of any kind, referred to in any portion of this specification is incorporated herein by reference.

This invention is susceptible to considerable variation in its practice. Therefore the foregoing description is not intended to limit, and should not be construed as limiting, the invention to the particular forms of the invention described with reference to the Drawings or Examples. Rather, what is intended to be covered is as set forth in the ensuing claims and the equivalents thereof permitted as a matter of law.

I claim:

1. A sectioned mechanical sealing ring divided into at least two sealing ring segments, each segment having:
   a) an arcuate outer wall portion,
   b) a radially extended sealing face,
   c) two sealing end surfaces, each sealing end surface being co-engageable with a sealing end surface of another said segment to form an interface between that pair of sealing end surfaces, and
   d) an arcuate inner wall portion having an arcuate recess therein traversing and extending laterally on both sides of said interface, said recess being defined in width by a pair of spaced-apart parallel radially extended interior wall faces of a pair of spaced-apart arcuate walls in said segment, one of each pair of said sealing end surfaces having projecting therefrom an aligning clip disposed between and engaging the interior wall faces of the recess on one side of said interface and extendable into the recess on the other side of said interface to maintain said sealing end surfaces in detachable co-engagement and alignment with each other.

2. A sealing ring in accordance with claim 1 wherein said ring is divided substantially diametrically into a pair of said sealing ring segments.

3. A sealing ring in accordance with claim 2 wherein said sealing end surfaces are planar, and when said sealing end surfaces are engaged and aligned with each other, each of the resultant two interfaces falls in a plane that is axially and radially disposed relative to said ring.

4. A sealing ring in accordance with claim 1 wherein said pair of spaced apart arcuate walls and said recess extend around substantially the entire interior of said sealing ring.

5. A sealing ring in accordance with claim 4 wherein said ring is divided substantially diametrically into a pair of said sealing ring segments.

6. A sealing ring in accordance with claim 5 wherein said sealing end surfaces are planar, and when said sealing end surfaces are engaged and aligned with each other, each of the resultant two interfaces falls in a plane substantially axially and substantially radially disposed relative to said ring.

7. A sealing ring in accordance with claim 1 wherein said aligning clip is adhesively bonded to said interior wall faces of said arcuate walls.

8. A sealing ring in accordance with claim 1 wherein said aligning clip comprises a strip of flexible metal bent into a U-shape with the end portions of the arms of the U-shaped strip disposed between and tensioned against said interior wall faces of said arcuate walls such that the curved portion of the U-shaped strip projects beyond the sealing end surface of one sealing ring segment and is extendable into the recess on the other side of said interface.

9. A sealing ring in accordance with claim 8 wherein said end portions are adhesively bonded to the respective interior wall faces of said arcuate walls against which they are tensioned.

10. A sealing ring in accordance with claim 1 wherein at least one of said pair of spaced-apart arcuate walls has an outer wall face remote from the recess, and wherein said aligning clip comprises a generally "L"-shaped strip of flexible metal wherein one leg of said strip is bent into a U-shape with the end portions of the arms of the U-shaped strip disposed between and tensioned against said interior wall faces of said arcuate walls such that the curved portion of the U-shaped strip projects beyond the sealing end surface of one sealing ring segment and is extendable into the recess on the other side of said interface; and wherein the other leg of said strip is bent to form at least an inner section proximate to one said arm and an outer section remote from said arm, such that said other leg fits snugly onto an arcuate wall having said outer wall face, and such that said outer section is tensioned against said outer wall face to thereby anchor said aligning clip in place.

11. A sealing ring in accordance with claim 1 wherein the arcuate wall remote from the radially extended sealing face of each segment has at least two spaced-apart transverse notches each of which is disposed to receive a retainer to secure said segment to the gland of a mechanical seal against the tension of tension means disposed between the gland and the segment and to secure the segment against rotation in the gland.

12. A sealing ring in accordance with claim 11 wherein said ring is divided substantially diametrically into a pair of said sealing ring segments.

13. A sealing ring in accordance with claim 12 wherein said sealing end surfaces are planar, and when said sealing end surfaces are engaged and aligned with each other, each of the resultant two interfaces falls in a plane substantially axially and substantially radially disposed relative to said ring.

14. A sealing ring in accordance with claim 13 wherein said aligning clip comprises a strip of flexible metal bent into a U-shape with the end portions of the arms of the U-shaped strip disposed between and tensioned against said interior wall faces of said arcuate walls such that the curved portion of the U-shaped strip projects beyond the sealing end surface of one sealing ring segment and is extendable into the recess on the other side of said interface.

15. A sealing ring in accordance with claim 14 wherein said end portions are adhesively bonded to the respective interior wall faces of said arcuate walls against which they are tensioned.

16. A sealing ring in accordance with claim 14 wherein at least one of said pair of spaced-apart arcuate walls has an outer wall face remote from the recess, and wherein said aligning clip comprises a generally "L"-shaped strip of flexible metal wherein one leg of said strip is bent into a U-shape with the end portions of the arms of the U-shaped strip disposed between and tensioned against said interior wall faces of said arcuate walls such that the curved portion of the U-shaped strip projects beyond the sealing end surface of one sealing ring segment and is extendable into the recess on the other side of said interface; and wherein the other leg of said strip is bent to form at least an inner section proximate to one said arm and an outer section remote from said arm, such that said other leg fits snugly onto an arcuate wall having said outer wall face, and such that said outer section is tensioned against said outer wall face to thereby anchor said aligning clip in place.

17. An aligning clip which comprises a strip of flexible metal which, before bending, occupies a single plane and is generally "L"-shaped, and wherein:

1) one leg of said strip is bent into a U-shape with the end portions of the arms of the U-shaped strip sized, configured and adapted to be disposed in a recess between and tensioned against the inner wall faces of a pair of spaced-apart opposed parallel walls of a ring segment having a transverse planar terminus, such that when so disposed, the curved portion of the U-shaped strip projects beyond said terminus; and 2) the other leg of said strip is bent, sized and configured to form at least an inner section proximate to one said arm and an outer section remote from said arm whereby said other leg can fit snugly onto one of said walls so that when the arms of the U-shaped strip are disposed as specified in 1), said outer section is tensioned against an outer wall face of one of said walls to thereby anchor said aligning clip in place.

18. A mechanical seal assembly comprising (i) a stationary gland having secured therein a non-rotatable split mechanical seal having an axially disposed sealing face, (ii) a rotary affixed to a rotatable shaft and including a mechanical seal disposed to rotate with said shaft and having an axially disposed sealing face adapted to sealably and rotatably engage the sealing face of the split mechanical seal, and (iii) means for maintaining said sealing faces in sealable engagement with each other, wherein said split mechanical seal is a sectioned mechanical sealing ring divided into at least two sealing ring segments, each segment having:

a) an arcuate outer wall portion;

b) a radially extended sealing face, c) two sealing end surfaces, each sealing end surface being co-engageable with a sealing end surface of another said segment to form an interface between that pair of sealing end surfaces, and d) an arcuate inner wall portion having an arcuate recess therein traversing and extending laterally on both sides of said interface, said recess being defined in width by a pair of spaced-apart parallel radially extended interior wall faces of a pair of spaced-apart arcuate walls in said segment, one of each pair of said sealing end surfaces having projecting therefrom an aligning clip disposed between and engaging the interior wall faces of the recess on one side of said interface and extendable into the recess on the other side of said interface to maintain said sealing end surfaces in detachable co-engagement and alignment with each other.

19. A mechanical seal assembly in accordance with claim 18 wherein the arcuate wall remote from the radially extended sealing face of each segment has at least two spaced-apart transverse notches each of which is disposed to receive a retainer to secure said segment to the gland of a mechanical seal against the tension of tension means disposed between the gland and the segment and to secure the segment against rotation in the gland.

20. A mechanical seal assembly in accordance with claim 18 wherein said end portions are adhesively bonded to the respective interior wall faces of said arcuate walls against which they are tensioned.

* * * * *